(12) United States Patent
Gordon et al.

(10) Patent No.: US 7,449,142 B2
(45) Date of Patent: Nov. 11, 2008

(54) PLANT FOR USE IN CONTINUOUS STEELMAKING PROCESS

(75) Inventors: Iakov Gordon, Toronto (CA); Frank M. Wheeler, Toronto (CA)

(73) Assignee: Hatch Ltd., Mississauga, Ontario (CA)

( * ) Notice: Subject to any disclaimer, the term of this patent is extended or adjusted under 35 U.S.C. 154(b) by 372 days.

(21) Appl. No.: 11/060,328

(22) Filed: Feb. 17, 2005

(65) Prior Publication Data

US 2005/0179174 A1 Aug. 18, 2005

Related U.S. Application Data

(63) Continuation-in-part of application No. 10/146,208, filed on May 15, 2002, now Pat. No. 6,875,251.

(51) Int. Cl.
    *C21B 13/12* (2006.01)
(52) U.S. Cl. ........................ 266/161; 266/171
(58) Field of Classification Search ........... 266/171, 266/142, 161, 200, 900
    See application file for complete search history.

(56) References Cited

U.S. PATENT DOCUMENTS

| 3,463,629 | A | * | 8/1969 | Hatch ........................ 75/10.15 |
| 3,522,356 | A |   | 7/1970 | Olds et al. |
| 3,715,200 | A |   | 2/1973 | Archibald et al. |
| 3,752,897 | A |   | 8/1973 | Atsukawa |
| 4,113,468 | A | * | 9/1978 | Gudenau et al. ........... 75/10.47 |
| 4,119,454 | A |   | 10/1978 | Rath |
| 4,402,083 | A |   | 8/1983 | Paskarbeit et al. |
| 4,564,388 | A | * | 1/1986 | Vallomy ..................... 75/10.12 |
| 5,572,544 | A | * | 11/1996 | Mathur et al. ................... 373/8 |
| 5,946,339 | A | * | 8/1999 | True ............................. 373/72 |
| 6,155,333 | A |   | 12/2000 | Vallomy |
| 6,524,362 | B1 | * | 2/2003 | Eichberger et al. ......... 75/10.46 |
| 6,875,251 | B2 | * | 4/2005 | Gordon et al. ............. 75/10.47 |
| 2002/0083794 | A1 | * | 7/2002 | Berger et al. ................ 75/10.35 |
| 2003/0000338 | A1 | * | 1/2003 | Shver ........................ 75/10.41 |
| 2004/0060389 | A1 | * | 4/2004 | Roth et al. ................... 75/10.41 |
| 2004/0214125 | A1 |   | 10/2004 | McCaffrey |

FOREIGN PATENT DOCUMENTS

| EP | 0 866 139 A1 | 9/1998 |
| EP | 1 298 224 A1 * | 4/2003 |
| JP | 61 023709 | 2/1986 |
| WO | WO 99/05466 | 2/1999 |

* cited by examiner

*Primary Examiner*—Kevin P Kerns
(74) *Attorney, Agent, or Firm*—K & L Gates LLP

(57) ABSTRACT

A plant for the continuous manufacture of steel includes a direct reduction furnace for producing direct reduced iron (DRI) and a stationary electric arc furnace for melting the DRI. The electric arc furnace has a plurality of electrodes for melting the DRI. Heat for melting the charge material is preferably provided by open arcs between the electrodes and the metal bath. The slag preferably has low basicity to reduce the rate of refractory erosion, and preferably contains about 8 to 20% by weight MgO, about 7 to 30% by weight FeO and has a basicity of about 1.5 to 2.0. Preferably, the direct reduction furnace is a shaft furnace and is located above the electric arc furnace so that the direct reduced iron can be fed to the electric arc furnace by gravity through inclined conduits.

24 Claims, 4 Drawing Sheets

PLANT FOR USE IN CONTINUOUS STEELMAKING PROCESS

REFERENCE TO PRIOR APPLICATIONS

This is a continuation-in-part application of application Ser. No. 10/146,208, filed May 15, 2002, and issued on Apr. 5, 2005 as U.S. Pat. No. 6,875,251.

FIELD OF THE INVENTION

The present invention to relates to steelmaking, and more particularly to continuous processes for steelmaking.

BACKGROUND OF THE INVENTION

A challenge facing the steel industry in its never-ending quest for greater efficiency is the development of a continuous steelmaking process. While the upstream iron-making and the downstream casting of steel are well-established continuous processes, steelmaking remains essentially a batch operation.

Steelmaking is typically conducted in a circular electric arc furnace. Reduced iron in the form of small spheres or briquets, and optionally some steel scrap, is charged into the furnace and melted by very high power electrodes, creating a power density in the furnace hearth of about 2000 to 2500 $kW/m^2$. The molten metal is protected and partly refined by a liquid slag layer comprised primarily of metal oxides. After the charge is melted, the molten metal is poured or tapped from the furnace for subsequent alloying and casting.

A number of processes for continuous steelmaking have been proposed in the prior art. However, none has proved to be completely satisfactory.

One example of a continuous steelmaking process is proposed in U.S. Pat. No. 4,119,454 (Rath). According to the Rath patent, the steelmaking step is performed continuously in a stationary round or rectangular electric arc furnace. The furnace electrodes are immersed in the slag layer, which acts as a resistive heating element to heat the underlying molten metal layer. In the Rath patent, scrap steel is fed continuously or intermittently into the furnace through one or more openings, and tapping of slag and steel is performed periodically. The metal bath in the furnace is maintained at a volume of about 1 to 10 tap volumes.

The Rath process uses a highly reactive and superheated slag, with the operating temperature of the slag being 40-100° C. above the steel melting temperature and 70-220° C. above the slag melting temperature. Thus, the melting temperature of the slag used in the Rath process is about 30-120° C. less than the steel melting temperature. This superheated slag has very high liquidity and high reactivity, and results in excessive wear on the furnace refractory.

U.S. pat. No. 4,133,468 (Gudenau et al.) describes a method for continuously melting sponge iron (also referred to herein as "direct reduced iron" or "DRI") in the production of steel having a carbon content of as low as 0.015%. According to Gudenau et al, the furnace electrodes are immersed in a foaming slag layer. The slag is basic, has a $CaO/SiO_2$ ratio sufficient to maintain good liquidity, and contains from 7 to 30% FeO and 5 to 12% MgO. A slag according to this composition may, however, still have high fluidity and high reactivity with respect to the furnace refractory.

U.S. Pat. No. 3,463,269 (Hatch) describes the use of a stationary six-electrode rectangular electric arc furnace in the production of steel. The furnace is charged continuously with sponge iron to produce the final or semi-finished steel. Steel scrap is charged into the furnace at the beginning of the furnace campaign in order to form a pool ("heel") of molten steel which remains in the furnace below the tap hole at all times. In the Hatch process, the power input is limited by maintaining the metal bath temperature just above the steel melting point to minimize under-cutting of the slag and refractory attack, and to prevent violent boiling due to reaction of carbon with metals in the slag. This method has a number of disadvantages, including the possibility that the furnace will be run with a highly superheated slag of high basicity. Furthermore, the Hatch method does not disclose continuous charging of scrap into the furnace.

Therefore, there is a continued need for a continuous method of steelmaking.

SUMMARY OF THE INVENTION

The present invention overcomes the above-described disadvantages of the prior art, by providing a continuous steelmaking process in which iron is continuously fed to and melted in a stationary electric arc furnace, with refractory wear being minimized through the use of a relatively highly basic, high melting slag composition.

In one aspect, the present invention provides a slag composition for use in a steel manufacturing process in which iron and/or iron alloys are melted in an electric arc furnace containing a bath of molten steel and a slag layer, wherein the slag composition contains MgO in an amount of 8 to 20% by weight, and has a basicity of from about 1.5 to about 2.0.

According to a preferred embodiment of the invention, the slag composition contains MgO in an amount of about 10 to 17% by weight, and more preferably about 13 to 15% by weight.

In another aspect, the present invention provides a process for making steel in an electric furnace having a plurality of electrodes, the process comprising: maintaining a bath of molten steel in the furnace, the bath being maintained in a liquid condition by heat supplied from the electrodes; maintaining a layer of molten slag covering the bath of molten steel, wherein the slag has a melting point which is substantially the same as or greater than a temperature of the steel in the bath; charging a charge material into the furnace, the charge material comprising iron and/or an iron alloy; melting the charge material in the furnace; and withdrawing the molten steel from the bath.

Preferably, the molten steel in the bath has a carbon content of less than or equal to about 0.10% by weight; with the charge material comprising direct reduced iron, and optionally including steel in an amount of up to about 20% by weight. The charge material is preferably charged into the furnace continuously, with the bath of molten steel preferably having a volume of from about 7 to about 13 tap volumes.

Preferably, heat is transferred from the electrodes to the metal bath by open arcs, with the power density in the furnace hearth being from about 250 to about 500 $kW/m^2$. The slag is preferably superheated by about 40 to about 150° C. above the bath temperature.

In yet another aspect, the present invention provides a plant for manufacturing steel. The plant according to the invention comprises: (a) a direct reduction furnace for producing DRI; and (b) a stationary electric arc furnace for melting the DRI. The electric arc furnace has a plurality of electrodes for melting the DRI and the furnace contains a layer of slag which contains FeO in an amount of about 7 to 30% by weight.

Preferably, the DRI is fed by gravity from the direct reduction furnace to the electric arc furnace. The plant preferably comprises one or more conduits extending between the direct reduction furnace and the electric arc furnace for transferring DRI from the direct reduction furnace to the electric arc furnace. Each conduit preferably communicates with the interior of the electric arc furnace through a charging port located in a roof of the furnace. The conduits are preferably sloped at an angle of 45 to 90° to a horizontal plane.

The electric arc furnace preferably comprises a rectangular furnace comprising four side walls and a hearth, wherein the side walls and the hearth are lined with refractory brick which is based on magnesium oxide. The furnace preferably has a width of about 9 meters and a length of about 27 meters, and the furnace has a volume sufficient to contain a steel bath of about 7 to 13 tap volumes. The electrodes are preferably located along a longitudinal axis of the furnace and are arranged in pairs. Even more preferably, the furnace includes six electrodes arranged as three pairs, wherein a distance between adjacent pairs of electrodes is greater than a distance between the electrodes of each pair. Each charging port is located adjacent to a pair of electrodes, such that the electrodes and the charging port form a triangle, with the charging port located at an apex of the triangle which is substantially equally spaced from each of the electrodes.

The plant preferably also includes at least one conduit for charging steel scrap into the electric arc furnace. Each conduit communicates with an interior of the electric arc furnace through a charging port located in the furnace roof. The charging ports are preferably located between adjacent pairs of electrodes. The plant preferably includes one or more scrap steel hoppers, one or more scrap steel runners, and one or more scrap steel charging ports located in the furnace roof, and each scrap steel runner preferably extends between one of the scrap steel hoppers and one of the scrap steel charging ports.

Preferably, the side walls and the roof of the electric arc furnace are cooled by staves and finger coolers, and the cooling of the walls is preferably sufficient to cause solidification of the slag along the side walls of the furnace. Preferably, electric arc power is delivered to the furnace by a plurality of single-phase furnace transformers. The total furnace power is preferably at least about 100 to 120 MW and a hearth area of the furnace has a power density of from about 250 to about 500 kW/m².

The direct reduction furnace for producing the DRI preferably comprises a vertical furnace such as a shaft furnace or a rotary furnace such as a rotary kiln. Preferably, the direct reduction furnace is installed above the electric arc furnace so that the DRI outlet of the direct reduction furnace is spaced vertically above one or more charging ports of the electric arc furnace. The DRI is transferred from the direct reduction furnace to the electric arc furnace pneumatically, by mechanical conveyors or by gravity. The plant preferably also comprises one or more DRI hoppers to which the DRI is transferred from the direct reduction furnace and from which the DRI is conveyed to the electric arc furnace; and one or more DRI runners, each extending from one of the DRI hoppers to a charging port of the electric arc furnace. Each of the DRI runners is inclined at an angle of from about 45 to 90 degrees to a horizontal plane so that the DRI is gravity-fed through the runners.

Preferably, the plant further comprises a ladle metallurgical furnace in which the steel produced by the electric arc furnace is refined and finished, and/or a continuous casting apparatus for casting the steel.

BRIEF DESCRIPTION OF THE DRAWINGS

The invention will now be described, by way of example only, with reference to the accompanying drawings, in which.

DETAILED DESCRIPTION OF PREFERRED EMBODIMENTS

The preferred embodiments of the invention will now be described below with reference to the use of a stationary six-electrode arc furnace 10 (also referred to herein as a "steelmaking furnace") as a continuous melter. The use of this type of furnace is well established in the smelting of nickel and copper. Despite the references to this type of furnace in the prior art mentioned above, it is not typically used in the steel industry.

Figure 1:
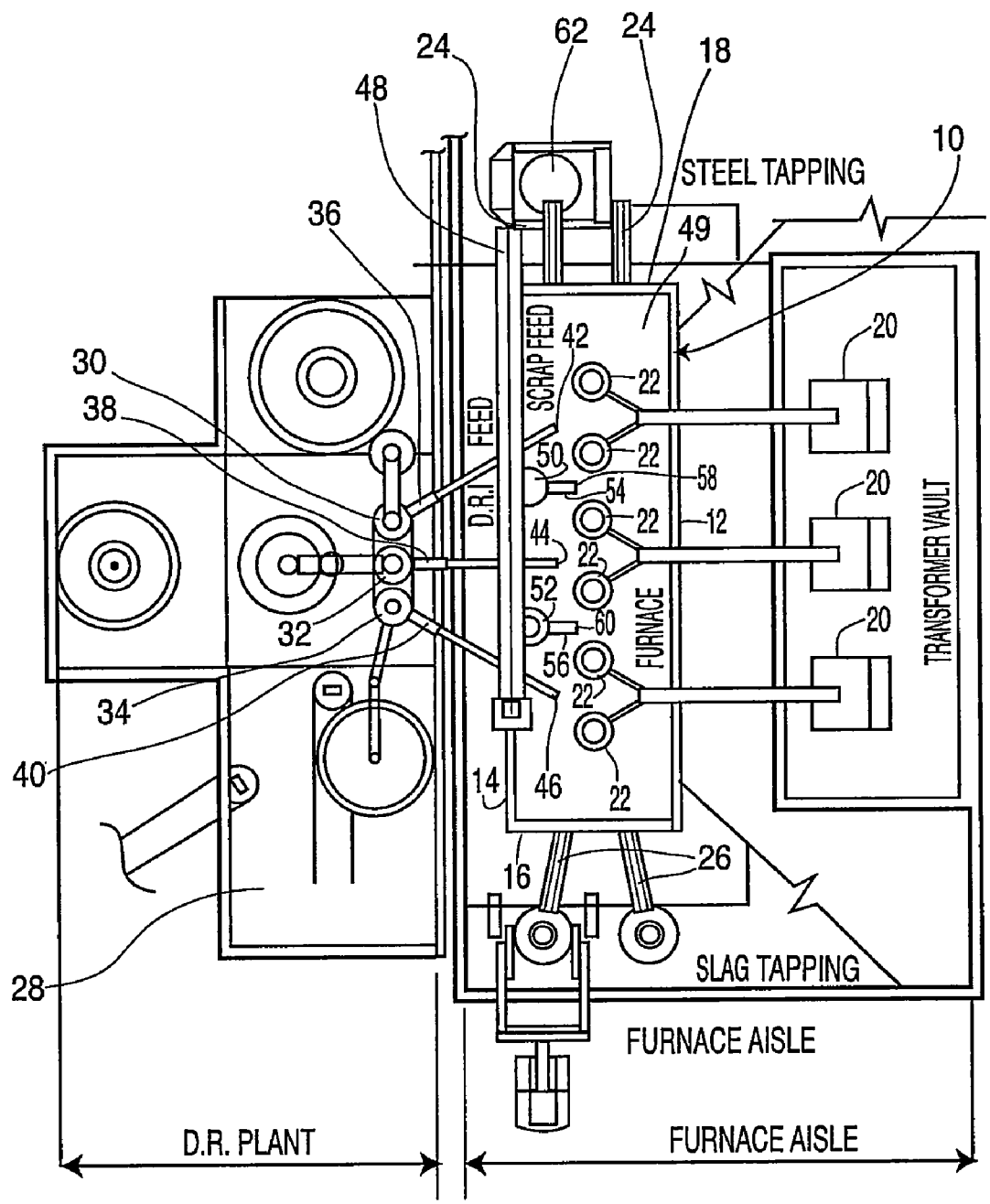
FIG. 1 is a schematic plan view of a stationary six electrode arc furnace adapted for use in the continuous steelmaking process according to the invention.

As shown in FIG. 1, the furnace 10 is preferably rectangular in shape, having side walls 12, 14 and end walls 16, 18. The furnace walls and hearth are lined with refractory brick (not shown) which is based on magnesium oxide. In a particularly preferred embodiment of the invention, the furnace may have dimensions of about 9×27 meters, sufficient to provide a relatively large bath size of about 7 to 13 tap volumes, more preferably about 10 tap volumes. The large bath provides a "flywheel" effect, enabling the periodic tapping of steel while continuing to melt the charge material, and also ensures sufficient analytical compensation of the steel chemistry and sufficient heat for the melting process.

The preferred embodiment of the invention will be described in connection with the use of direct reduced iron (DRI) as a feed material. DRI is produced by a direct reduction shaft furnace (FIG. 2) upstream from the steelmaking furnace 10. The DRI is preferably fed to the steelmaking furnace 10 in the form of briquets or spheres having a diameter of about 12 to 16 mm. The DRI may either be hot or cold, but is preferably hot. The typical chemical composition of DRI produced in a shaft furnace is as follows (as percentages): Fe(total)=92.34; Fe(metallic)=85.22; FeO=9.54; C=1.71; $SiO_2$=1.51; $Al_2O_3$=0.8; CaO=0.72; MgO=0.28; S=0.01; P=0.04; other residuals=0.19.

The steelmaking furnace is preferably operated in open-bath mode, utilizing the natural slag-foaming characteristics associated with the continuous feed/melting of DRI. The slag composition is discussed in greater detail below. The walls and roof of the furnace are cooled by staves and finger coolers (as described in U.S. Pat. No. 5,378,260, incorporated herein by reference). The cooling of the walls causes solidification of slag around the perimeter of the bath. This slag "accretion" protects the refractory lining of the furnace in the slag area and at the slag/metal interface.

Electric arc power is delivered to the furnace 10 from three single-phase furnace transformers 20, each coupled to a pair of electrodes 22 which are immersed in the slag layer in the furnace 10. The total furnace power is preferably at least about 100 to 120 MW, with the hearth area preferably having a power density of from about 250 to about 500 kW/m². This power density is an order of magnitude lower than that of a conventional steelmaking electric arc furnace, which has a power density of about 2000 to 2500 kW/m². Conventional furnaces require a higher power density so that batchwise melting of iron/steel can be carried out as quickly as possible. The lower power density of the furnace used in the present invention is a major factor contributing to the extended refractory life, as it reduces radiation heat flux to the refractory lining and prevents excessive slag superheating, discussed more fully below. The steel and slag are periodically tapped from tap holes 24 and 26, respectively, which are preferably located on opposite ends of the furnace. The tap holes 24,26 are closed by "mud" from a mud gun, and are opened either by drilling or burning the mud from the tap holes.

In a preferred embodiment of the invention, the steelmaking furnace described above is coupled to a DRI production plant which comprises a vertical furnace such as a direct reduction shaft furnace or a rotary furnace such as a rotary kiln. In the preferred plant layout shown in FIG. 2, the DRI production plant comprises a direct reduction shaft furnace 28 which is "stacked" above the steelmaking furnace 10 with the outlet of the shaft furnace being spaced vertically above the charging ports of the steelmaking furnace, so that the DRI can be fed essentially by gravity directly from the direct reduction shaft furnace 28 to the steelmaking furnace 10. Although the DRI is fed by gravity in the preferred embodiment of the invention, it will be appreciated that the DRI may instead be delivered to the steelmaking furnace 10 pneumatically or by mechanical conveyors. Screw conveyors are used to transfer the hot DRI from the shaft furnace 28 to hoppers from which it is conveyed to the steelmaking furnace 10.

Figure 2:
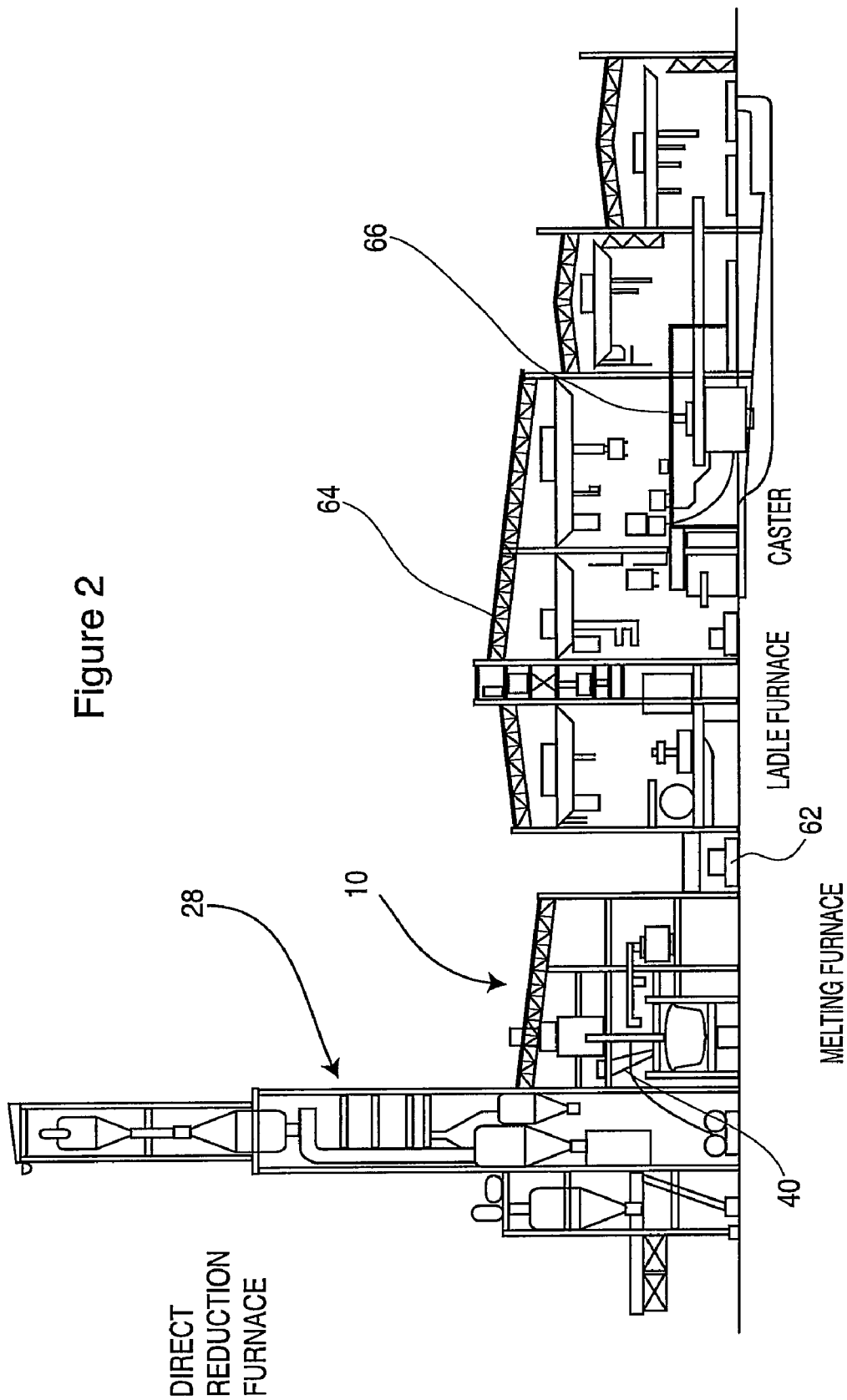
FIG. 2 is a schematic side elevation of a preferred plant layout according to the invention, and includes the stationary six electrode arc furnace shown in FIG. 1.

In the preferred plant layout shown in FIG. 2, the DRI is gravity-fed to the steelmaking furnace 10, with the output of the shaft furnace 28 being delivered to furnace hoppers 30, 32, 34 from where it is delivered to furnace 10 through runners 36, 38, 40. The DRI is preferably fed through runners 36, 38, 40 in the form of spherical pellets as described above. In order to prevent blockage of the runners, the inventors have found that the runners are preferably inclined at an angle of from about 45 to 90 degrees to the horizontal.

The runners deliver the DRI to the furnace 10 through a plurality of DRI charging ports 42, 44, 46 located in the furnace roof 49. The DRI charging ports are located so as to provide a symmetrical distribution of charge materials in the furnace 10 and to prevent damage to the electrodes. For optimum distribution of DRI, the inventors have found that each DRI charging port should be located in the furnace roof adjacent to a pair of electrodes so that the electrodes and the charging port form a triangle, with the apex of the triangle at which the charging port is located being substantially equally spaced from each electrode.

The charge material fed to the steelmaking furnace in the present invention may preferably include scrap steel in amounts of up to 20% by weight. This scrap steel is preferably preheated and is sufficiently reduced in size to allow it to be continuously fed by a conveyor 48 to hoppers 50, 52, from where it is delivered to furnace through runners 54, 56. The scrap enters the furnace 10 through two scrap charging ports 58, 60 located in the furnace roof, each scrap charging port preferably being located between two pairs of electrodes 22 for optimum distribution. The use of this scrap charging system eliminates the need for a high capacity furnace charge crane.

As the DRI and scrap steel are continuously charged and melted in the steelmaking furnace 10, the tap holes are opened periodically to tap the steel and slag. The semi-finished steel is transferred in ladles 62 on a continuous basis to a ladle metallurgical furnace 64 for refining and finishing, from which the steel ladles are brought to a continuous slab caster 66.

A set of specific metallurgical process requirements are required to support stable continuous operation of the steelmaking furnace according to the invention. For example, the carbon content of the initially charged DRI should be reduced to less than 0.10%, and more preferably to less than 0.05%, in the steelmaking furnace. This is preferably achieved without injection of gaseous oxygen. Furthermore, the chemical and physical properties of the slag must be engineered to support the slag foaming which is necessary in open-bath melting of continuously fed DRI, and to avoid slag-line refractory erosion.

These requirements which must be met by the slag are somewhat conflicting. For example, carbon content of the steel is reduced by increasing FeO content in the slag. However, FeO reacts with the refractory materials, which are comprised primarily of MgO. In order to produce a slag which meets these requirements, the inventors have found that it is particularly advantageous to provide a slag composition which has a melting point substantially the same as or greater than that of the steel bath temperature, so as to avoid excessive superheating of the slag. As used herein in relation to the slag melting point, "substantially the same" means ±30° C. relative to the steel bath temperature. During operation of the steelmaking furnace, the slag is superheated above its melting point and above the melting point of the steel in the bath. In the present invention, the slag is preferably superheated by about 40 to about 150° C. above the slag melting point and the steel bath temperature. Having a slag melting point close to the steel bath temperature means that the slag will be superheated to a lesser degree than if a lower melting slag was used as, for example, in the above-mentioned Rath patent. As the fluidity of the slag is proportional to the degree of superheating, the slag according to the present invention will be relatively less fluid (i.e. more viscous) than a highly superheated slag, such as that disclosed by Rath. This lower fluidity translates to reduced erosion of the furnace refractory.

According to the invention, achieving a higher slag melting temperature is at least partially accomplished by increasing the MgO content in the slag. Increasing the MgO content also directly reduces the rate of erosion of the refractory walls, independent of its effect on the slag melting temperature. According to the present invention, the MgO content of the slag is preferably in the range of from 8 to 20%, more preferably from about 10 to 17%, and even more preferably from about 13 to 15%.

Figure 3:
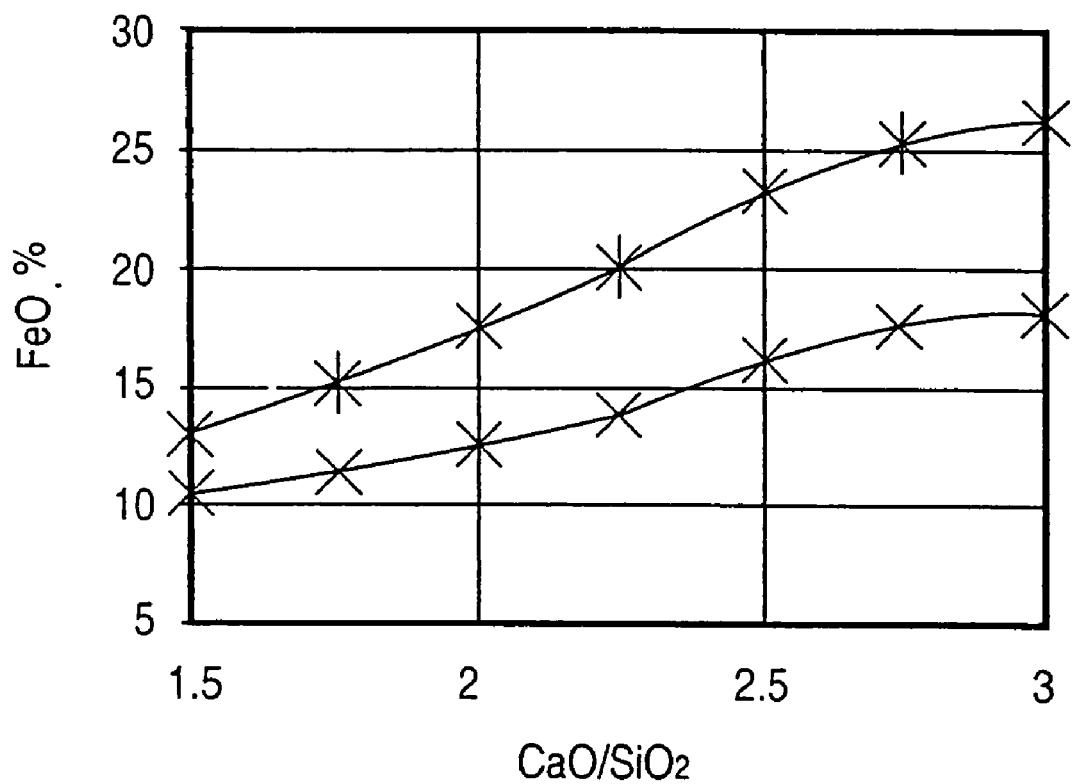
FIG. 3 is a graph of FeO content versus $CaO/SiO_2$ ratio.

To further prevent refractory erosion, the slag preferably has a relatively low $CaO/SiO_2$ ratio, thereby reducing the slag basicity and reducing the amount of FeO required in the slag for a given carbon content. In a particularly preferred embodiment, the $CaO/SiO_2$ ratio (also referred to herein as "basicity") is preferably from about 1.5 to about 2.0. FIG. 3 is a graph which shows the relationship between FeO content and $CaO/SiO_2$ ratio. The FeO content of the slag is in the range from about 7 to 30%.

Manipulation of the chemical composition of the slag can be at least partially accomplished by adjusting the composition of the DRI. For example, the current level of process control of gas-based direct reduction processes allows the metallization (i.e. the amount of residual iron oxides) and the carbon content of the DRI to be set independently. Thus, the "natural" melt-in carbon of the steel bath can be targeted through the DRI composition, while maintaining sufficient foaming of the slag. Secondly, the DRI typically contains low levels of sulphur and phosphorus. Therefore, removal of these elements in the steelmaking furnace is not a major requirement, providing greater flexibility in selecting the slag composition.

Depending on the composition of the DRI, it may also be preferred to add amounts of CaO, $SiO_2$ and MgO to the slag. This may be accomplished by adding amounts of high-calcium lime and/or dolomitic lime to the furnace. High-calcium lime/dolomitic lime typically have the following chemical compositions (as percentages): CaO=96/56.6; MgO=1/40.6; $SiO_2$=1/0.8; $Fe_2O_3$=0.2/0.2; Fe=0.14/0.14; $Al_2O_3$=0.5/0.4; L.O.I.=1.3/1.4.

As an example, Table 1 illustrates calculated slag compositions for the production of steel having carbon contents of 0.10% and 0.06%.

TABLE 1

Calculated Slag Components as a Function of Carbon in Steel

| Slag Component | 0.06% C Content | 0.10% C Content |
|---|---|---|
| $SiO_2$ | 18.0 | 22.6 |
| CaO | 27.5 | 34.7 |
| MgO | 9.7 | 10.0 |
| $Al_2O_3$ | 9.5 | 12.0 |
| FeO | 32.4 | 17.4 |
| Other | 2.9 | 3.3 |
| $CaO/SiO_2$ | 1.5 | 1.5 |

Figure 4:
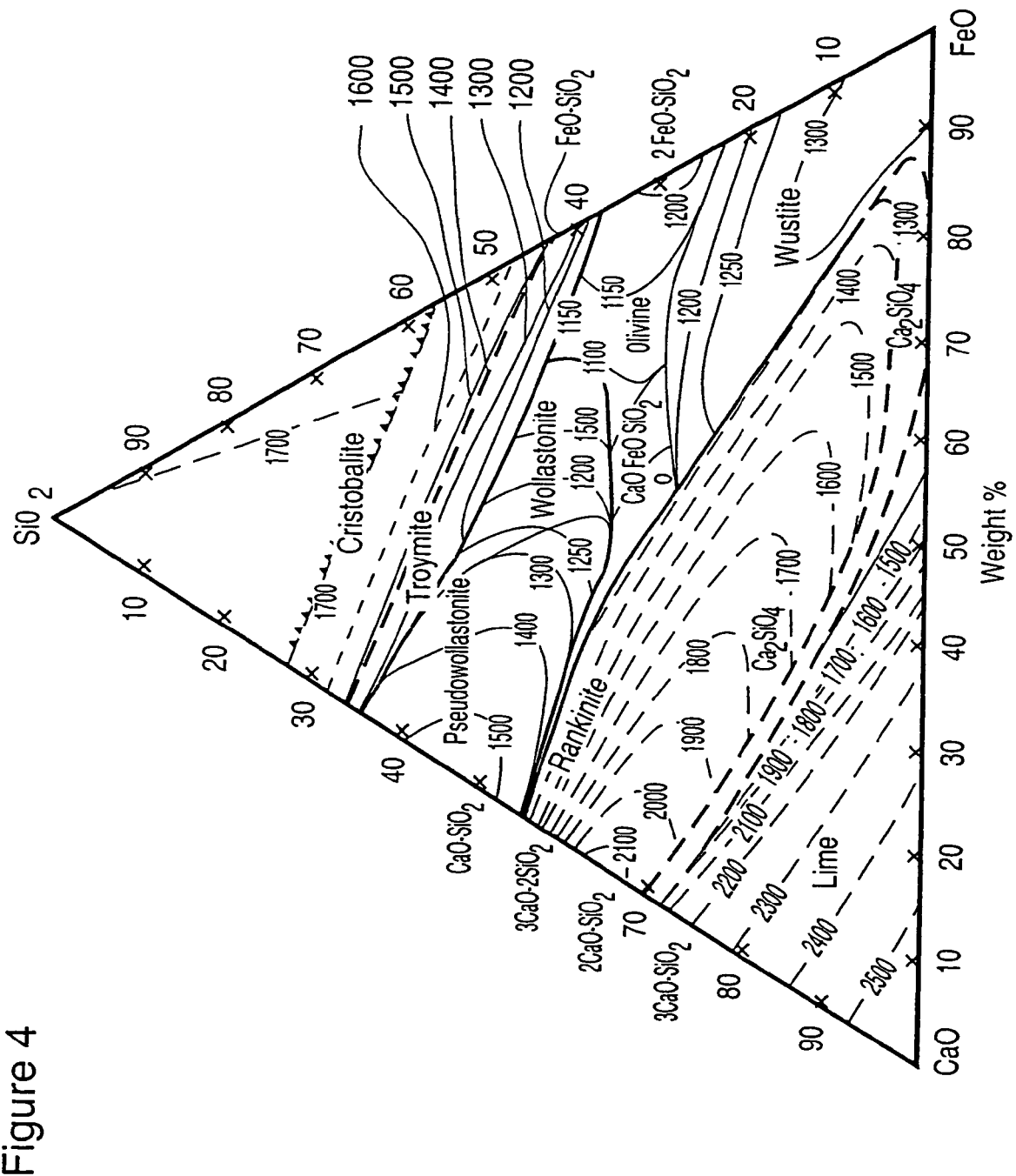
FIG. 4 is a ternary $FeO$—$CaO$—$SiO_2$ diagram from which the melting point of slag can be estimated.

FIG. 4 comprises a ternary FeO—CaO—$SiO_2$ diagram which can be used to estimate the melting points of slag compositions according to the invention. In order to estimate the melting point of a slag composition, it is assumed that CaO is the sum of CaO+MgO and $SiO_2$ is the sum of $SiO_2$+$Al_2O_3$. While recognizing that real world multi-component slag systems are far more complex, the approximate melting point provided by this method serves as a useful guide. Using the diagram of FIG. 4, the projected melting point for slag in the production of steel according to the invention with 0.06% carbon is approximately 1500-1530° C. This is substantially the same as the temperature of the steel bath which, in the case of steel having a carbon content of 0.06%, is about 1530° C.

In addition to lengthening furnace campaign life, the present invention is expected to provide other advantages. For example, the preferred plant configuration described above provides capital cost savings due to simplified scrap handling, less extensive DRI handling circuits, lower building costs and less expensive arc furnace. A plant according to the present invention may also have lower operating costs than a conventional plant, due in part to less refractory erosion, lower maintenance costs and lower dust disposal costs. Furthermore, the stationary electrode furnace is better matched than conventional arc furnaces to the direct reduction shaft furnace in terms of annual operating time. Specifically, the annual availability of both the shaft furnace and the stationary arc furnace are about 8,000 hours, whereas that of a conventional steelmaking furnace is about 7,200 hours.

Another advantage of the present invention, and one which distinguishes it from the Rath and Gudenau et al. patents mentioned above, is the use of open arcs, formed between the electrodes and the metal bath in the arc furnace, to provide the radiation heat for chemical reactions and for melting the charge materials. In the processes disclosed by Rath and Gudenau et al., arcing is preferably avoided and the electric energy of the electrodes is transformed to Joule heat by resistance heating of the slag. Resistive heating provides relatively low heat generation, resulting in low furnace productivity.

The formation of open arcs in the process of the invention is accomplished by the use of a relatively higher voltage than that used in the Rath and Gudenau et al. patents. Since the electrodes are immersed in the foaming slag in the process of the present invention, some portion of the heat will be provided by transformation of the electrical energy into Joule heat by electrical resistance of the slag, thereby keeping the bath temperature constant and providing additional heat for the melting process. The slag electrical conductivity for steel having a carbon content of 0.3% by weight is about 0.35-0.45 $om^{-1}cm^{-1}$, which is three times lower than that for steel having a carbon content of 0.06% by weight (1.2-1.3 $om^{-1}cm^{-1}$), with the slag resistance varying in the reverse order. The power released in the bath can be expressed by the following formula, which is disclosed in U.S. Pat. No. 3,715,200, incorporated herein by reference:

$$P_{bath}=P_{arc}/[V_t^2/(P_t R_{bath})-1]$$

wherein $P_{bath}$ is bath power; $P_{arc}$ is arc power (a function of arc length); $V_t$ is phase voltage; $P_t$ is phase power; and $R_{bath}$ is bath resistance.

Therefore, to maintain the same power release in the bath and the same bath temperature it is necessary to increase the voltage by a power of two, or to increase the voltage by some extent with a simultaneous decrease of arc power or arc length.

Although the invention has been described with reference to certain preferred embodiments, it is not intended to be limited thereto. Rather, the invention includes within its scope all embodiments which may fall within the scope of the following claims.

What is claimed is:

1. A plant for manufacturing steel, comprising:
   (a) a direct reduction furnace for producing direct reduced iron (DRI); and
   (b) a stationary electric arc furnace for melting the DRI, wherein the electric arc furnace is rectangular and has a pair of opposed side walls and a pair of opposed end walls, wherein the electric arc furnace has a plurality of electrodes for melting the DRI, wherein the electrodes are located along a longitudinal axis of the electric arc furnace and are arranged in pairs, wherein the side walls of the electric arc furnace are parallel to the longitudinal axis and the end walls are transverse to the longitudinal axis, and wherein the electric arc furnace includes a plurality of said pairs of said electrodes located along said longitudinal axis; and
   (c) a plurality of conduits extending between the direct reduction furnace and the electric arc furnace for transferring DRI from the direct reduction furnace to the electric arc furnace;
   (d) a plurality of charging ports located in a roof of the electric arc furnace, wherein each of said conduits communicates with an interior of the electric arc furnace through one of said charging ports;
   wherein the electric arc furnace contains a layer of slag which contains FeO in an amount of about 7 to 30% by weight; and
   wherein each said charging port is located adjacent to a pair of electrodes, such that the electrodes and the charging port form a triangle, with the charging port located at an apex of the triangle which is substantially equally spaced from each of the electrodes.

2. The plant according to claim 1, wherein the DRI is fed by gravity from the direct reduction furnace to the electric arc furnace.

3. The plant according to claim 2, wherein the direct reduction furnace is installed above the electric arc furnace so that a DRI outlet of the direct reduction furnace is spaced vertically above one or more charging ports of the electric arc furnace.

4. The plant according to claim 1, wherein each said conduit is sloped at an angle of 45 to 90° to a horizontal plane.

5. The plant according to claim 1, further comprising:
(e) at least one conduit for charging steel scrap into the electric arc furnace, each said conduit communicating with an interior of the electric arc furnace through a scrap charging port located in the roof of the electric arc furnace, and wherein said scrap charging port is located between adjacent pairs of said electrodes.

6. The plant according to claim 1, wherein the electric arc furnace comprises six electrodes which are arranged as three pairs, wherein a distance between adjacent pairs of electrodes is greater than a distance between the electrodes of each pair.

7. The plant according to claim 1, wherein the electric arc furnace has a width of about 9 meters and a length of about 27 meters, and wherein a hearth area of the electric arc furnace has a power density of from about 250 to about 500 kW/m$^2$.

8. The plant according to claim 1, wherein the side walls, the end walls and the roof of the electric arc furnace are cooled.

9. The plant according to claim 8, wherein the side walls, the end walls and the roof are cooled by staves and finger coolers, and wherein the cooling of the side walls and the end walls is sufficient to cause solidification of the slag along the side walls and the end walls of the electric arc furnace.

10. The plant according to claim 1, wherein electric arc power is delivered to the electric arc furnace by a plurality of single-phase furnace transformers.

11. The plant according to claim 10, wherein each of said transformers is coupled to one of said pairs of said electrodes.

12. The plant according to claim 1, wherein a total power of the electric arc furnace is at least about 100 to 120 MW and a hearth area of the electric arc furnace has a power density of from about 250 to about 500 kW/m$^2$.

13. The plant according to claim 1, wherein the direct reduction furnace for producing DRI comprises a shaft furnace or a rotary kiln.

14. The plant according to claim 1, wherein the DRI is transferred from the direct reduction furnace to the electric arc furnace pneumatically or by mechanical conveyors.

15. The plant according to claim 1, further comprising one or more DRI hoppers to which the DRI is transferred from the direct reduction furnace and from which the DRI is conveyed to the electric arc furnace.

16. The plant according to claim 15, further comprising one or more DRI runners, each of the DRI runners extending from one of said DRI hoppers to a charging port of the electric arc furnace.

17. The plant according to claim 16, wherein each of the DRI runners is inclined at an angle of from about 45 to 90 degrees to a horizontal plane so that the DRI is gravity-fed through the runners.

18. The plant according to claim 1, further comprising one or more scrap steel hoppers, one or more scrap steel runners, and one or more scrap steel charging ports located in the roof of the electric arc furnace;
wherein each said scrap steel runner extends between one of the scrap steel hoppers and one of the scrap steel charging ports.

19. The plant according to claim 1, further comprising a ladle metallurgical furnace in which the steel produced by the electric arc furnace is refined and finished.

20. The plant according to claim 1, further comprising a continuous casting apparatus for casting the steel.

21. The plant according to claim 1, wherein the slag further comprises MgO in an amount of 8 to 20% by weight and has a basicity of from about 1.5 to about 2.0.

22. The plant according to claim 21, wherein the electric arc furnace further comprises a hearth, and wherein the side walls, the end walls and the hearth are lined with refractory brick which is based on magnesium oxide.

23. The plant according to claim 1, wherein lower ends of the electrodes are immersed in the slag layer.

24. The plant according to claim 1, wherein the electric arc furnace has a volume sufficient to contain a steel bath of about 7 to 13 tap volumes.

* * * * *